United States Patent
Davie et al.

(10) Patent No.: US 7,733,876 B2
(45) Date of Patent: Jun. 8, 2010

(54) INTER-AUTONOMOUS-SYSTEM VIRTUAL PRIVATE NETWORK WITH AUTODISCOVERY AND CONNECTION SIGNALING

(75) Inventors: Bruce S. Davie, Cambridge, MA (US); Luca Martini, Denver, CO (US); Eric C Rosen, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 863 days.

(21) Appl. No.: 11/216,963

(22) Filed: Aug. 31, 2005

(65) Prior Publication Data

US 2006/0182122 A1    Aug. 17, 2006

Related U.S. Application Data

(60) Provisional application No. 60/652,526, filed on Feb. 11, 2005.

(51) Int. Cl.
*H04L 12/28* (2006.01)
*H04L 12/56* (2006.01)

(52) U.S. Cl. .................... 370/395.53; 370/401
(58) Field of Classification Search ............. 370/395.53
See application file for complete search history.

(56) References Cited

U.S. PATENT DOCUMENTS

| | | | | |
|---|---|---|---|---|
| 7,136,374 | B1 * | 11/2006 | Kompella | 370/352 |
| 7,152,115 | B2 * | 12/2006 | Ould Brahim et al. | 709/238 |
| 2003/0177221 | A1 * | 9/2003 | Ould-Brahim et al. | 709/223 |
| 2004/0028064 | A1 * | 2/2004 | Cetin et al. | 370/409 |
| 2004/0151181 | A1 * | 8/2004 | Chu et al. | 370/392 |
| 2005/0044262 | A1 * | 2/2005 | Luo | 709/238 |
| 2008/0084891 | A1 * | 4/2008 | Balus et al. | 370/409 |

OTHER PUBLICATIONS

Kompella, K. and Y. Rekhter, "Virtual Private LAN Service", draft-ietf-l2vpn-vpls-bgp-01.txt., Jan. 2004.*
Radoaca, V., Rosen, E., "Provisioning Models and Endpoint Identifiers in L2VPN Signaling", draft-ietf-l2vpn-signaling-00.txt, Sep. 2003.*
Kompella, V., et al, "Virtual Private LAN Services over MPLS", draft-ietf-ppvpn-vpls-ldp-01.txt, Jun. 2003.*
Andersson, L. and Rosen, E., "L2VPN Framework", draft-ietf-l2vpn-l2-framework-00.txt., Feb. 2003.*
Rekhter, Y. and Rosen, E., "BGP/MPLS IP VPNs", draft-ietf-l3vpn-rfc2547bis-01.txt., Sep. 2003.*

* cited by examiner

*Primary Examiner*—Gregory B Sefcheck
*Assistant Examiner*—Suk Jin Kang
(74) *Attorney, Agent, or Firm*—Brinks Hofer Gilson & Lione

(57) ABSTRACT

A layer-2 virtual-private-network (L2-VPN) service with automatic discovery and connection establishment is provided within a wide-area, multiple-autonomous-system (AS) network according to one of two approaches. In the first approach, inter-AS tunnels are used to connect pairs of provider edge (PE) routers of different ASes, and the PE routers then establish signaling connections to each other which are used to create pseudowires that implement the layer-2 connectivity. A second approach utilizes so-called "pseudowire switching" in which separate pseudowires are created within each AS and between ASes, and then the separate pseudowires are stitched together to form end-to-end connections. The first approach has the benefit of transparent operation provided by the tunnel, while the second approach requires fewer inter-AS signaling connections.

8 Claims, 8 Drawing Sheets

INTER-AUTONOMOUS-SYSTEM VIRTUAL PRIVATE NETWORK WITH AUTODISCOVERY AND CONNECTION SIGNALING

CROSS REFERENCE TO RELATED APPLICATIONS

This application claims the benefit under 35 U.S.C. §119 (e) of U.S. provisional application No. 60/652,526, filed Feb. 11, 2005, the disclosure of which is incorporated by reference herein.

BACKGROUND

There is increasing use in the data communications field of so-called "layer 2 virtual private networks" or L2-VPNs. Generally speaking, an L2-VPN is an emulated private local-area network (LAN) defined over a (usually non-private) wide-area network. The wide-area network may utilize a collection of technologies, including optical transmission technologies such as Synchronous Optical Networking (SONET), internetworking technologies such as the Internet Protocol (IP) and related protocols, and multi-protocol label switching (MPLS), which is a wide-area switching technology. L2-VPNs provide the benefits of private LANs, which include security and private administration, along with certain benefits of the Internet, which include widespread access and the existence of service providers. Organizations can create and operate far-flung private networks while outsourcing the long-haul infrastructure.

There are two predominant types of L2-VPNs. A virtual private wire service (VPWS) VPN consists of a mesh of point-to-point connections, and may be a particularly desirable service for customers whose networks are based on Asynchronous Transfer Mode (ATM) or Frame Relay techniques. A virtual private LAN service (VPLS) VPN resembles a network of layer-2 bridges having a point-to-multipoint configuration, and is particularly compatible with existing Ethernet technology. In either case, the VPN connections are carried via virtual connections (referred to as "pseudowires") that tunnel through the wide-area network. Certain specifications for VPWS and VPLS created under the auspices of the Internet Engineering Task Force (IETF) include the following:
  1. Draft-ietf-l2vpn-signaling-02.txt, entitled "Provisioning Models and Endpoint Identifiers in L2VPN Signaling," by Rosen et al., published September 2004, which describes mechanisms for establishing L2VPNs using Border Gateway Protocol (BGP)-based auto-discovery and the Label Distribution Protocol (LDP) or Layer-2 Tunneling Protocol (L2TP) for signaling.
  2. Draft-martini-pwe3-pw-switching-01.txt, entitled "Pseudo Wire Switching," by Martini et al., which describes how to splice or stitch pseudowire (PW) segments together to create longer PW segments for carrying layer-2 traffic.
  3. Draft-kompella-ppvpn-l2vpn-02.txt, entitled "Layer 2 VPNs Over Tunnels," by Kompella et al., which describes L2VPNs using BGP for both signaling and discovery.
  4. Draft-ietf-l2vpn-vpls-bgp-05.txt, which updates the above L2-VPNs are established in part through provisioning, which is performed by a network administrator, and in part through discovery and connection signaling processes that are performed automatically. For each VPN, logical entities called "forwarders" are created within edge routers of a service provider network. Each forwarder is coupled to one or more customer equipment (CE) devices (such as routers) that provide the connections to local customer network segments. The provider edge (PE) routers are configured with so-called network layer reachability information (NLRI) that identifies the forwarders and the L2-VPNs that they belong to. A routing protocol such as Border Gateway Protocol (BGP) is utilized to distribute NLRI among the PE routers. The PE routers then signal among themselves to establish respective sets of layer-2 connections for the VPNs through the wide-area network. These connections are then utilized to carry layer-2 data packets among sets of attached CE devices.

In addition to the above-listed documents, the following IETF document is also pertinent to the discovery and/or signaling processes in establishing L2-VPNs:
  Draft-ietf-l3vpn-bgpvpn-auto-04.txt, entitled "Using BGP as an Auto-Discovery Mechanism for Layer-3 and Layer-2 VPNs," by Ould-Brahim et al., published May 2004.

L2-VPNs may span multiple domains that may each constitute a separate "Autonomous System" (AS). An AS (also referred to as a "routing domain"), is the unit of router policy in the Internet—either a single network or a group of networks that is controlled by a single administrative entity (such as a university or business enterprise). In most cases, long-haul networks of different service providers constitute different ASes. It is necessary that the membership information for such VPNs be communicated across AS boundaries, and that the PE-to-PE connections also reach across AS boundaries.

An IETF draft draft-hmlu-l2vpn-bgp-discovery-01.txt, entitled "BGP-Based Auto-Discovery for L2VPNs", by Unbehagen et al. and published October 2004, describes a technique for inter-AS auto-discovery in VPWS services specifically. Multiple single-hop pseudowires (PWs) are stitched together to make end-to-end, multiple-hop PWs between pairs of PEs. AS border routers (ASBRs) that provide the interfaces between different ASes operate in either a proxy mode or a transparent mode. In the proxy mode, an ASBR substitutes its address into BGP advertisements that carry VPN forwarder information. PE routers in each AS need establish PWs to only the ASBRs within the same AS, and the ASBRs automatically extend the PWs to adjacent ASBRs of other ASes. In the transparent mode, the ASBRs pass the forwarder information to adjacent ASBRs of other ASes transparently, and also add inter-AS reachability information to enable the PEs in different ASes to establish signaling connections and pseudowires with each other.

A technique for distributing VPN routing information across ASes in the context of Layer-3 VPNs is described in Internet Draft draft-ietf-l3vpn-rfc2547bis-03.txt, entitled "BGP/MPLS IP VPNs," by Rosen et al. and published October 2004. Two specific techniques involve the use of external BGP (EBGP) to distribute labeled VPN-IPv4 routes among ASes. In one case, the ASBRs are provided with the labeled VPN-IPv4 routes and provide them to adjacent ASBRs in other ASes, which in turn distribute them to the PE routers of those ASes. In another case, the ASBRs do not maintain the VPN-IPv4 routes, but rather are utilized to carry multi-hop EBGP connections among the PEs of different ASes. The PEs then signal among themselves to exchange the VPN-IPv4 routes.

SUMMARY

Notwithstanding the various known techniques as described above, there is a need for automated methods of forming multi-AS L2-VPNs. In particular, there is a need for automated methods of forming multi-as L2-VPNs of the VPLS type, which will likely enjoy good popularity due the large installed base of Ethernet equipment and the relative ease of managing a point-to-multipoint (versus a point-to-point) architecture. The known techniques discussed above do not provide the necessary auto-discovery and connection-establishment signaling for such L2-VPNs. Also, it may be desirable to employ alternative techniques in forming L2-VPNs of the VPWS type.

Apparatus and methods are disclosed for providing a layer-2 virtual-private-network (L2-VPN) service within a wide-area, multiple-autonomous-system network. According to a first disclosed method, a border router of a first autonomous system, maintains labeled routes to provider edge (PE) routers of the first autonomous system, and the PE routers include L2-VPN forwarders that forward packets to and from attached layer-2 customer subnetworks. The border router advertises the labeled routes outside the first autonomous system so as to enable the creation of a tunnel between a first PE router of the first autonomous system and a second PE router of a second autonomous system.

The first PE router exchanges layer-2 network layer reachability information with the second PE router. The network layer reachability information from each PE router includes an identifier of a VPN and an identifier of a respective L2-VPN forwarder operating within the PE router. The first PE router also engages in a connection signaling session with the second PE router to create one or more direct pseudowire connections between the first and second PE routers, with each pseudowire connection extending between respective VPN forwarders in the PE routers to carry packets between customer subnetworks of the VPN.

The first disclosed method provides for automatic discovery and building of L2-VPNs in a multiple-AS environment without requiring extensive involvement of the border routers. In one embodiment, the route advertisement employs a network-layer routing protocol capable of distributing routing information among ASes, such as Border Gateway Protocol (BGP), and the pseudowire signaling employs a label distribution protocol (LDP).

According to a second disclosed method, hop-by-hop auto-discovery and pseudowire-establishment processes are performed. As part of the auto-discovery process, a first provider edge (PE) router of a first autonomous system (AS) sends a first internal routing information (R-I) message to a first border router of the first AS. The first internal R-I message includes network layer reachability information (NLRI) for a first L2-VPN forwarder operating within the first PE router, the NLRI including an identifier of a VPN and an identifier of the first L2-VPN forwarder. The first border router responds to the first internal R-I message by sending a first external R-I message along a path between the first AS and a second AS, the first external R-I message forwarding the NLRI of the first L2-VPN forwarder and identifying the first border router as a router through which the first L2-VPN forwarder can be reached. A second border router of the second AS receives a second external R-I message which includes the NLRI of the first L2-VPN forwarder and identifies a border router along the path between the first and second ASes as a router through which the first L2-VPN forwarder can be reached. When the first and second ASes are neighboring ASes, then the second external R-I message is in fact the first external R-I message, but otherwise it is a separate message generated by an ASBR of a "transit" AS in response to receiving the first external R-I message from the first border router. The second border router responds to the second external R-I message by sending a second internal R-I message to a second PE router of the second AS, the second internal R-I message including the NLRI of the first L2-VPN forwarder and identifying the second border router as a router through which the first L2-VPN forwarder can be reached.

As part of the pseudowire establishment process, respective internal signaling connections and internal pseudowires are established between the respective PE router and border router of the respective ASes. At each of the first and second border routers, respective external signaling connections and external pseudowires are established along the path between the first and second ASes, and the external and internal pseudowires are stitched together to form at least part of an end-to-end connection between the first L2-VPN forwarder and a second L2-VPN forwarder in the second PE router over which communications of the VPN are to be carried.

The second method has the advantage of requiring significantly fewer signaling connections between different ASes, and thus can give providers greater control over the number of such signaling connections and the amount of internal AS information that must be exposed outside of each AS.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
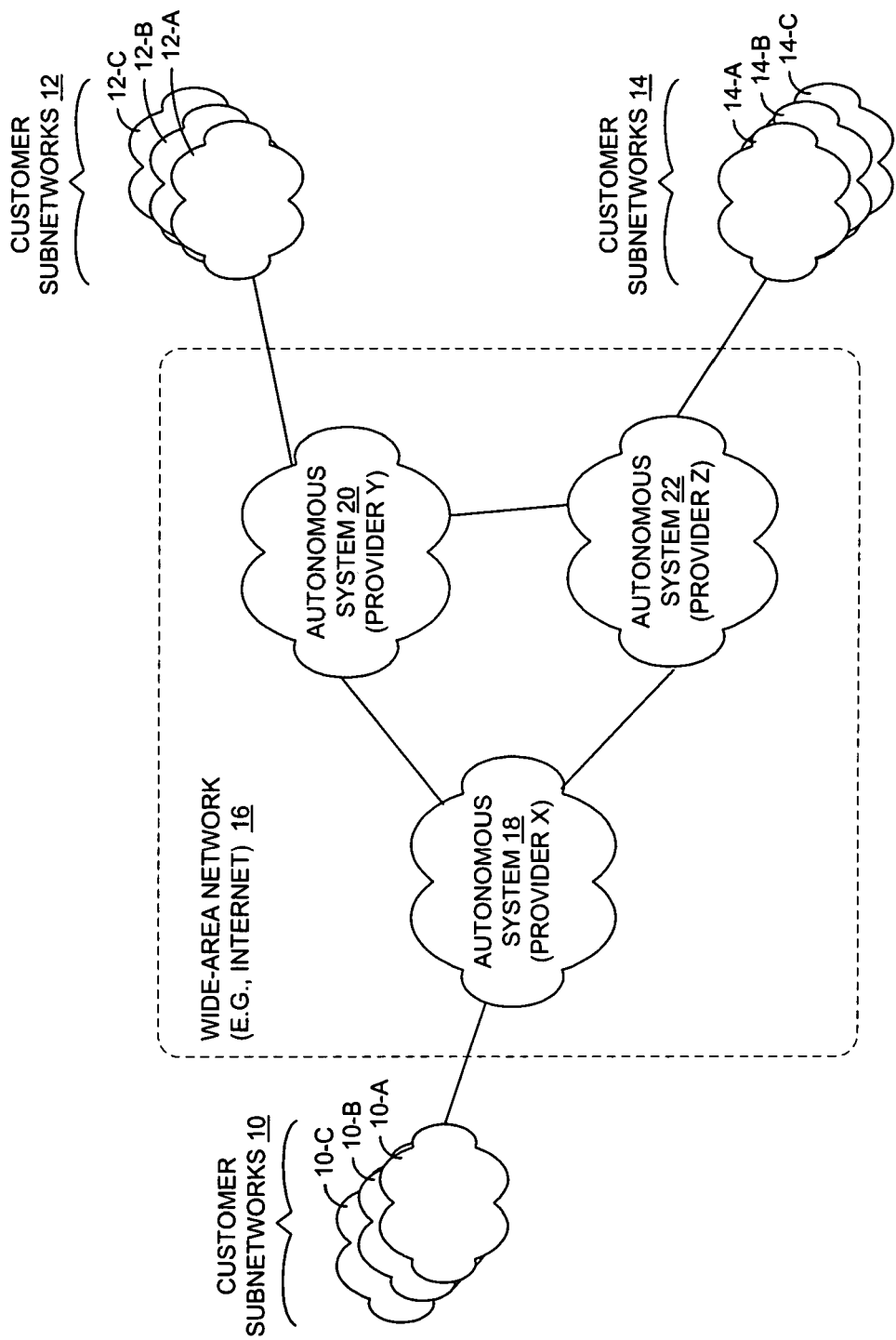
FIG. 1 is a block diagram of showing a multiple-autonomous-system, wide-area network in which layer-2 virtual private network (VPN) services are provided to customer networks.

FIG. 1 shows a network in which layer-2 VPN services are provided to a number of customer networks. As a simplified example, networks of three customers A, B and C are shown. The network of customer A includes three distinct subnetworks 10-A, 12-A and 14-A, and likewise the network of customer B includes subnetworks 10-B, 12-B and 14-B, and of customer C, subnetworks 10-C, 12-C and 14-C. Generally, the various subnetworks for a given customer may be separated geographically and/or organizationally. For example, the subnetwork 110-A may be located at the corporate headquarters for customer A, while the subnetworks 12-A and 14-A may be at remote sales offices for customer A. Other examples of such separate subnetworks include geographically distributed workgroups, customers or vendors requiring network access. It will be understood that each customer subnetwork may be a single network or a collection of networks.

The VPN services are provided by one or more service providers via a wide-area network 16 such as the Internet. VPN connections are required to span across multiple autonomous systems (ASes) within the network 16. In the illustrated example, VPN services are provided by three separate providers X, Y and Z, and the network of each provider forms a respective distinct AS 18, 20 and 22.

The example of FIG. 1 is provided for illustration purposes only. In general, the techniques disclosed herein may be applied to VPNs spanning multiple ASes whether or not such ASes belong to one service provider or multiple service providers. As mentioned above, an AS is a unit of routing policy in the Internet. One or more instances of an interior routing protocol (e.g. Open Shortest Path First (OSPF)) is utilized within an AS, and an exterior (inter-domain) routing protocol such as BGP is utilized to collect and forward network reachability information among different ASes.

Additionally, in the simplified example of FIG. 1 each AS 18, 20 and 22 is shown as being connected to respective subnetworks of all three customers A, B and C (e.g., AS 18 is connected to subnetworks 10-A, 10-B and 10-C). In general, the ASes in a given wide-area network may have connections to different sets of customers, depending for example on the locations of customer equipment relative to the service access points of the various providers. Indeed, one premise of the presently disclosed techniques is that a single provider (and thus a single AS) cannot itself provide VPN services to some customers because of geographic limitations, for example, and thus it is desired that VPN services be provided across multiple ASes. Thus if customer B has no operations in an area serviced by AS 18, for example, then there would be no subnetwork 10-B, and AS 18 would have connections to only subnetworks 10-A and 10-C.

Figure 2:
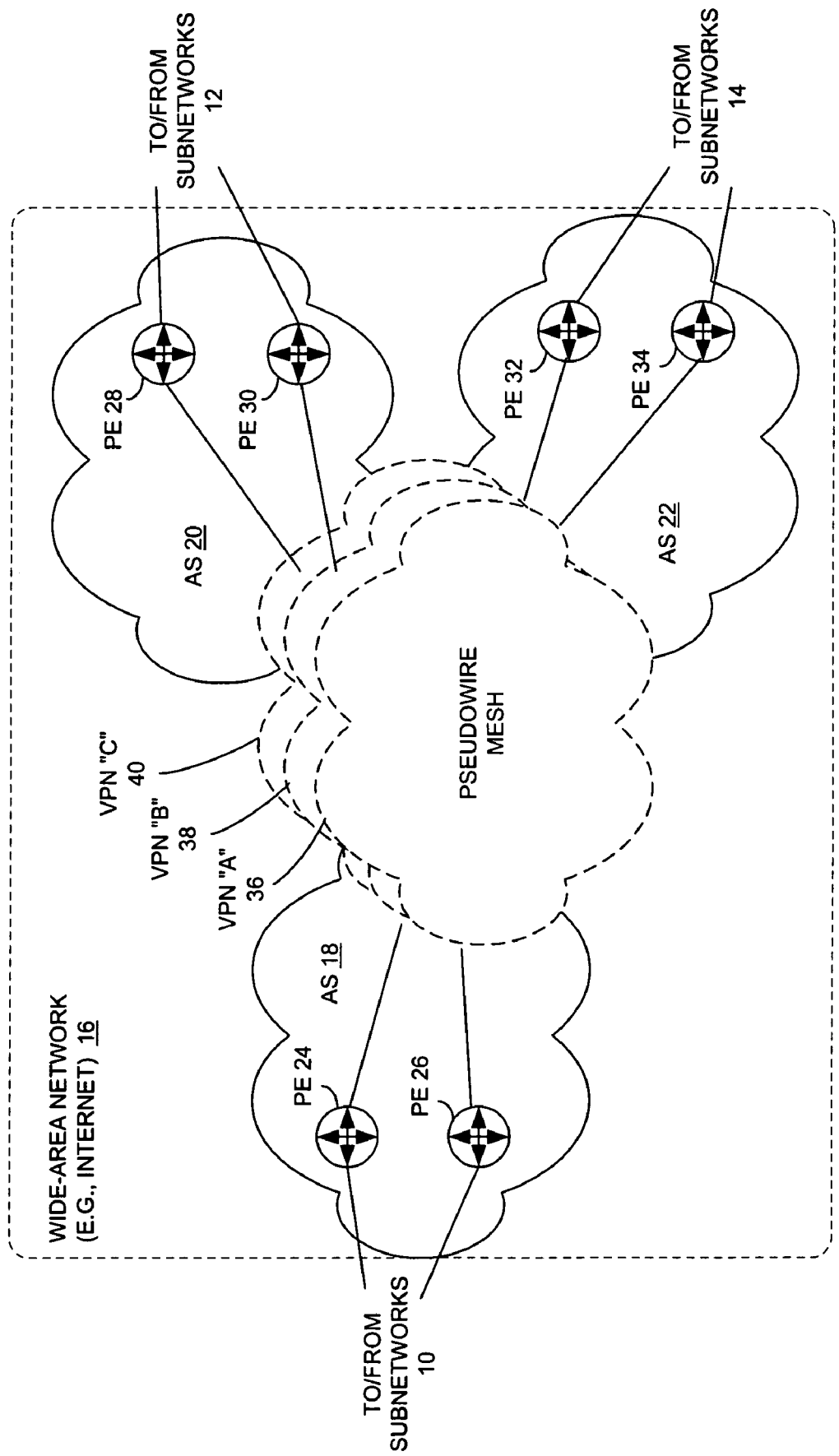
FIG. 2 is a block diagram depicting inter-autonomous-system meshes of pseudowires providing connectivity for the layer-2 VPN services in the network of FIG. 1.

FIG. 2 shows a simplified view of how connections are made in the network 16 to provide layer-2 VPN services. Each AS 18, 20 and 22 is shown as including one or more provider edge (PE) routers shown as PEs 24 and 26 in AS 18, PEs 28 and 30 in AS 20, and PEs 32 and 34 in AS 22. The PEs have "external" connections to the customer subnetworks 10, 12 and 14, where "external" is with reference to the network 16. The PEs also have "internal" connections to each other via a plurality of "pseudowire meshes", which are groups of logical point-to-point connections. Specifically, pseudowire meshes 36, 38 and 40 are shown as providing the internal connections for L2-VPNs of customers A, B and C respectively.

For each customer L2-VPN, the respective pseudowire mesh 36, 38 or 40 provides full-mesh connectivity among all the PEs that connect to a subnetwork of that customer. As known in the art, the exact arrangement of a pseudowire mesh depends in part on the specific L2-VPN service type it supports (e.g., VPLS versus VPWS), and the techniques for forming the appropriate type of pseudowire mesh based on the service type are known in the art. The presently disclosed techniques are concerned primarily with discovery and signaling operations that enable the individual pseudowires of the meshes to be established.

Figure 3:
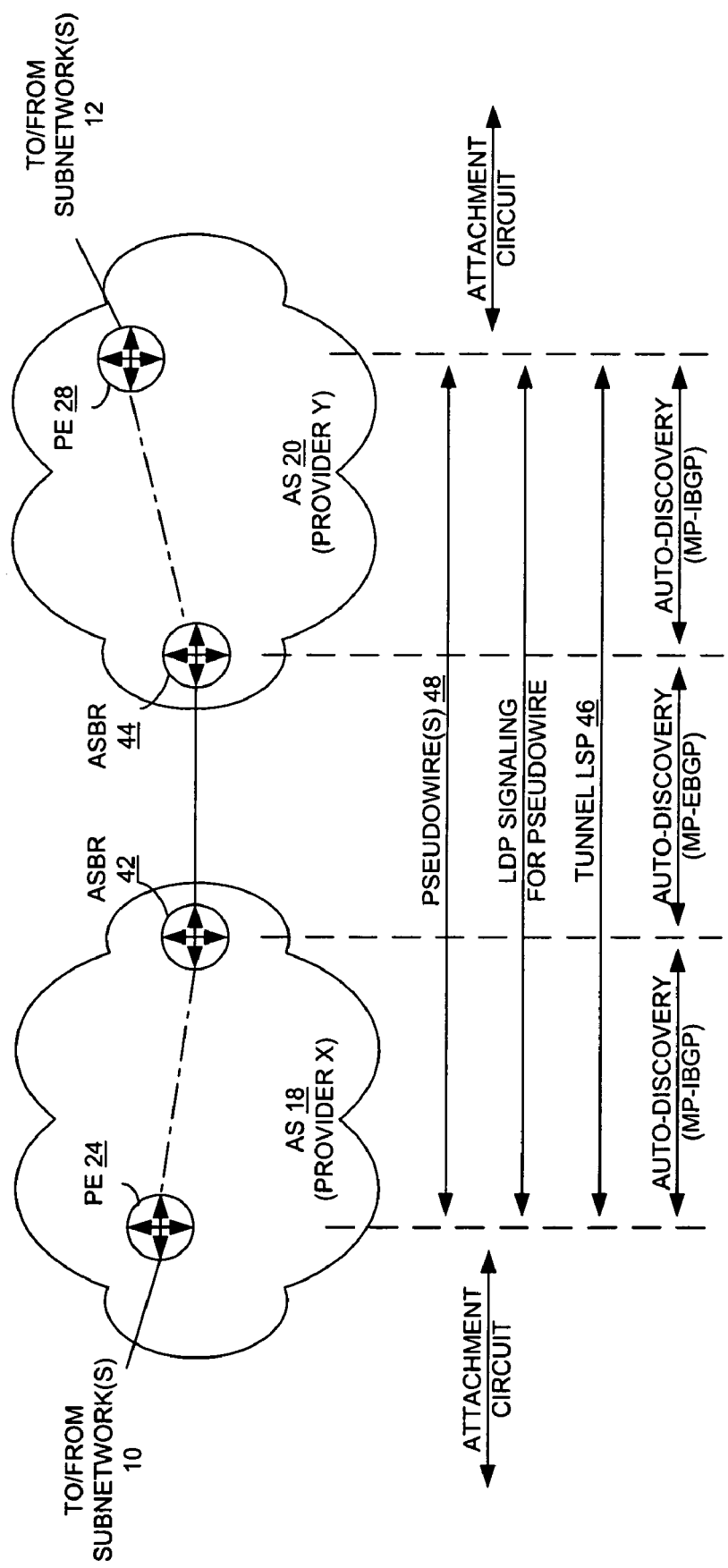
FIG. 3 is a block diagram depicting connections and multiple-layer communications according to a first approach for layer-2 VPN auto-discovery and signaling in the network of FIG. 1.

FIG. 3 shows representative details of two of the ASes 18 and 20 and a schematic depiction of a first approach to discovery and signaling, which is referred to herein as the "multiple-AS tunneling" approach. In addition to the respective PE routers (e.g. PEs 24 and 28 as shown), each AS 18 and 20 also includes one or more respective autonomous system border routers (ASBRs) (e.g. ASBRs 42 and 44 as shown). The ASBRs engage in an inter-AS routing protocol (e.g. BGP) and may perform various filtering and security functions for the respective AS in which they reside. As shown, the connection between ASes 18 and 20 is made via the ASBRs 42 and 44. In the simplified example of FIG. 3, the two ASes 18 and 20 are neighboring ASes, i.e., they are connected together directly without any intervening ASes. As described below, both the first disclosed approach as well as a second approach described below can also be used when there are one or more ASes between the ASes 18 and 20, such intervening ASes being termed "transit ASes."

As illustrated in the lower part of FIG. 3, there are several communications processes or steps involved in establishing pseudowires across AS boundaries between pairs of PE routers. Initially, a routing information exchange protocol such as BGP is carried out within each AS 18, 20 and between the ASes 18 and 20 via the ASBRs 42 and 44. This process is shown as "auto-discovery" in FIG. 3. It should be noted that there is an "interior" version of BGP for intra-AS communication of routing information, which is referred to as IBGP, and an "exterior" version of BGP for inter-AS communication of routing information, which is referred to as EBGP. Additionally, a recent "multi-protocol" (MP) enhancement to BGP includes support for multiple types of network address. Thus, MP-IBGP is used within each AS 18 and 20, and MP-EBGP is used between the ASes 18 and 20.

Once a PE router (e.g. PE 24) discovers a PE router in another AS (e.g. PE 28) via the BGP mechanism, it signals the other PE router to establish an inter-AS "tunnel" between them, which in the illustrated example is a tunnel label-switched path (LSP) 46. The tunnel LSP 46 provides a direct virtual connection between the PE routers 24, 28 that will be used to carry L2-VPN traffic between them. The tunnel LSP 46 is associated with a set of "outer" labels (not shown) that are appended to packets when being forwarded and that are used to switch the packets along the tunnel LSP.

After the tunnel LSP 46 is established between the PEs 24 and 28, the PEs 24 and 28 then utilize a label distribution protocol (LDP) to establish one or more pseudowires 48 between respective pairs of VPN forwarders within the PEs 24 and 28. VPN forwarders are described below. Each pseudowire 48 carries the traffic for a corresponding specific VPN. Each pseudowire 48 is associated with a set of "inner" labels that are appended to packets when being forwarded. The inner labels are used to identify the forwarder within a receiving PE router 24 or 28 that is to receive the packet.

Figure 4:
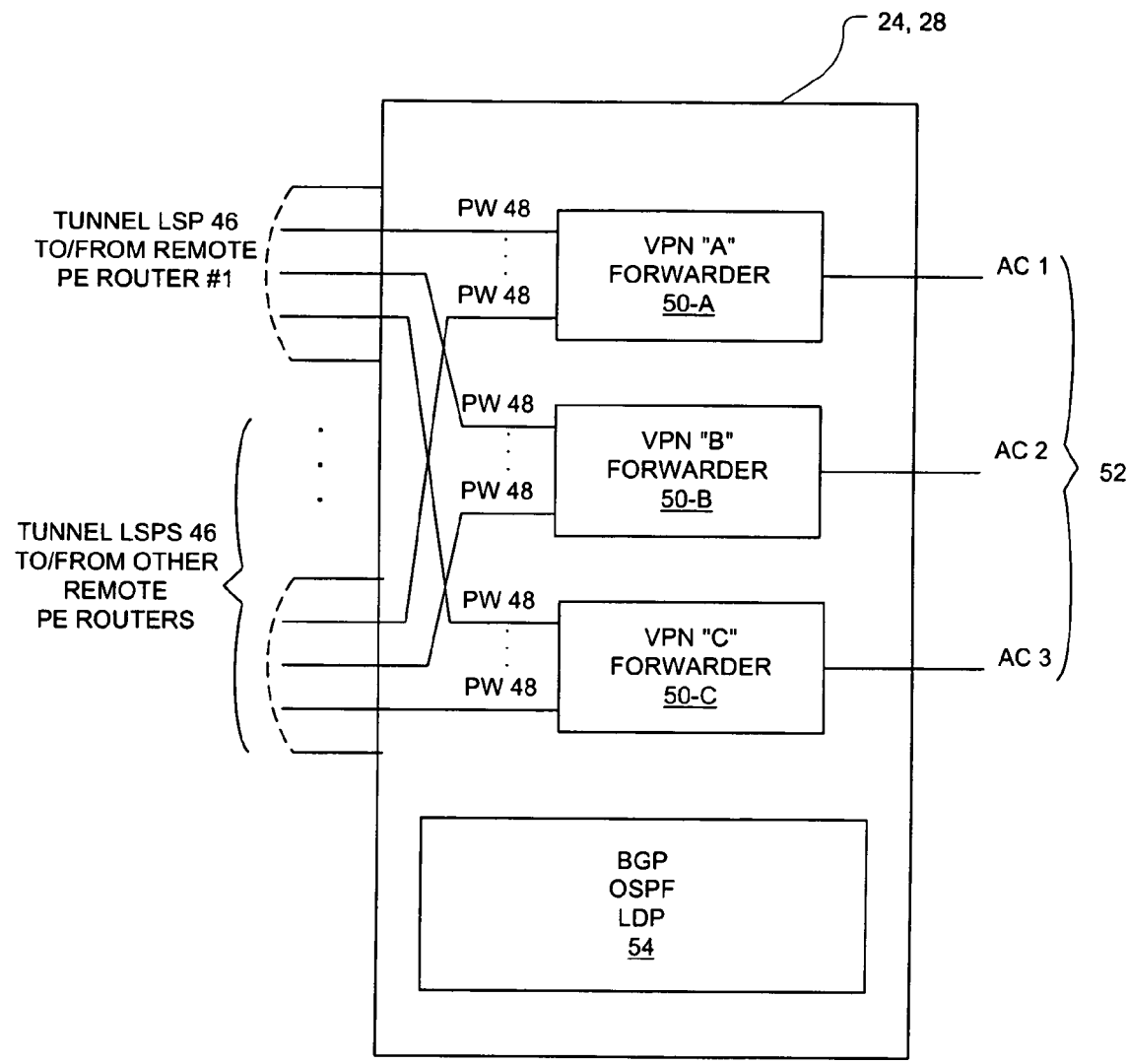
FIG. 4 is a block diagram of a PE router of FIG. 3.

FIG. 4 shows the structure of a PE router such as PE 24 or PE 28. The PE router includes one or more VPN forwarders 50 (e.g., 50-A, 50-B, 50-C), each having one or more pseudowire (PW) connections 48 to other PE routers over corresponding tunnel LSPs 46. Each forwarder 50 operates as part of a corresponding L2-VPN. Each forwarder 50 is connected to a corresponding "attachment circuit" (AC) 52, which is a connection to a local customer subnetwork (e.g. subnetwork 10 or 12 of FIG. 1). The PE routers also include additional functional components 54, such as instances of BGP, OSPF, LDP, etc.

During operation, a forwarder 50 accepts a packet from an attachment circuit 52, consults an internal forwarding table (not shown) to identify a remote customer subnetwork in which the packet recipient resides, encapsulates the packet with the outer and inner MPLS labels of the tunnel LSP 46 and pseudowire 48 via which the remote customer subnetwork is reached, and then forwards the encapsulated packet to an adjacent router (not shown) through which the identified tunnel LSP 46 passes. Each forwarder 50 also operates in the reverse fashion, i.e., accepts an encapsulated packet from a remote forwarder 50 via an adjacent router, decapsulates the packet and forwards it to a local attachment circuit 52 as indicated by the identity of the pseudowire 48 on which the encapsulated packet was received.

Figure 5:
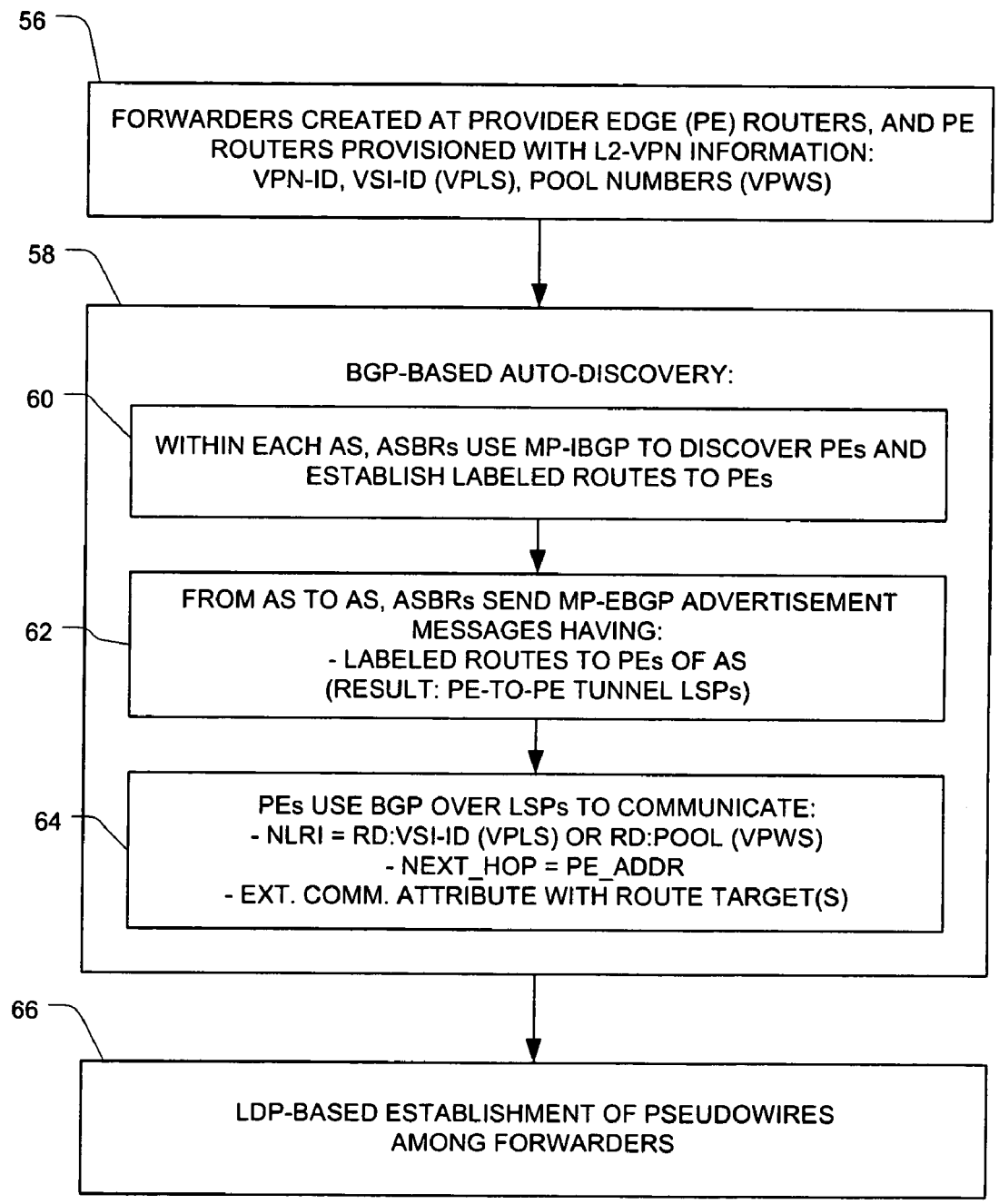
FIG. 5 is a flow diagram illustrating a process by which layer-2 VPNs are formed in the network of FIG. 1 according to the first approach depicted in FIG. 3.

FIG. 5 shows in greater detail the process by which the tunnel LSPs 46 and pseudowires 48 are established among PE routers residing in different ASes according to the multiple-AS tunneling approach. In step 56, a network administrator creates the instances of the forwarders 50 and provisions each forwarder 50 with network information for the L2-VPN in which it operates. This information includes a VPN identifier (VPN ID). It may also include a VSI identifier (VSI ID), or a pool number (POOL) that identifies the AC(s) 52 for the associated customer subnetwork(s) of the VPN. These are described below.

In step 58, the PE routers and ASBRs engage in BGP-based auto-discovery to exchange network-layer reachability information (NLRI). Each PE router generates BGP update (advertisement) messages which include the provisioned network information for its forwarders 50. As shown at 60, within each AS, the ASBRs and PEs use IBGP to enable the ASBRs to discover the PEs located in the same AS and establish labeled routes to them (e.g. ASBR 42 maintains a labeled route to PE 24, etc.).

At step 62, the ASBRs use MP-EBGP to exchange the labeled routes to their respective same-AS PEs, and each ASBR forwards the labeled routes it receives from other ASBRs to the PEs of its own AS. Thus ASBR 44 (FIG. 3) receives EBGP advertisements from ASBR 42 containing a labeled route to PE 24, for example, and forwards this labeled route to PE 28. As a result of this label-forwarding process, a tunnel LSP is created between each pair of PEs residing in different ASes (i.e., each tunnel LSP interconnects a PE router in one AS with a PE router in another AS).

At step 64, the PEs use BGP to send advertisement messages for the layer-2 VPN information. Specifically, each advertisement message includes the following information:

NLRI=RD:VSI-ID or RD:POOL#
Next_Hop=PE_ADDR
Extended Community Attribute (ECA) including one or more Route Targets where RD is a route distinguisher, and PE_ADDR is the loopback IP address of the advertising PE router. The VPN-ID provisioned within the advertising PE router is used as the route distinguisher. The VSI-ID is an identifier of a "virtual switching instance", which is a particular type of forwarder 50 utilized in VPLS VPNs specifically. Each VSI-ID uniquely identifies a given VSI within a particular VPN. VSI-IDs may be assigned, for example, by simply numbering the VSIs within each VPN from 1 to n. Alternatively, it may be desirable to utilize the PE_ADDR as the VSI-ID, which is possible because there is only one VSI permitted per VPN at a given PE router.

In the case of VPWS service, the NLRI includes a pool number (POOL) rather than the VSI-ID.

Each PE router that receives an advertisement examines the Route Target to determine if it pertains to a VPN for which the PE router has any forwarders 50. If not, the message is ignored. If so, then as shown at step 66 the PE router utilizes the information to establish a pseudowire 48 to the remote advertising PE router (more specifically, to the forwarder 50 on whose behalf the advertisement was generated). Once this process is complete, two forwarders 50 within respective PEs of different ASes can transfer packets to each other on behalf of their respective customer subnetworks (e.g. subnetworks 10, 12) according to the particular L2-VPN scheme being used.

Figure 6:
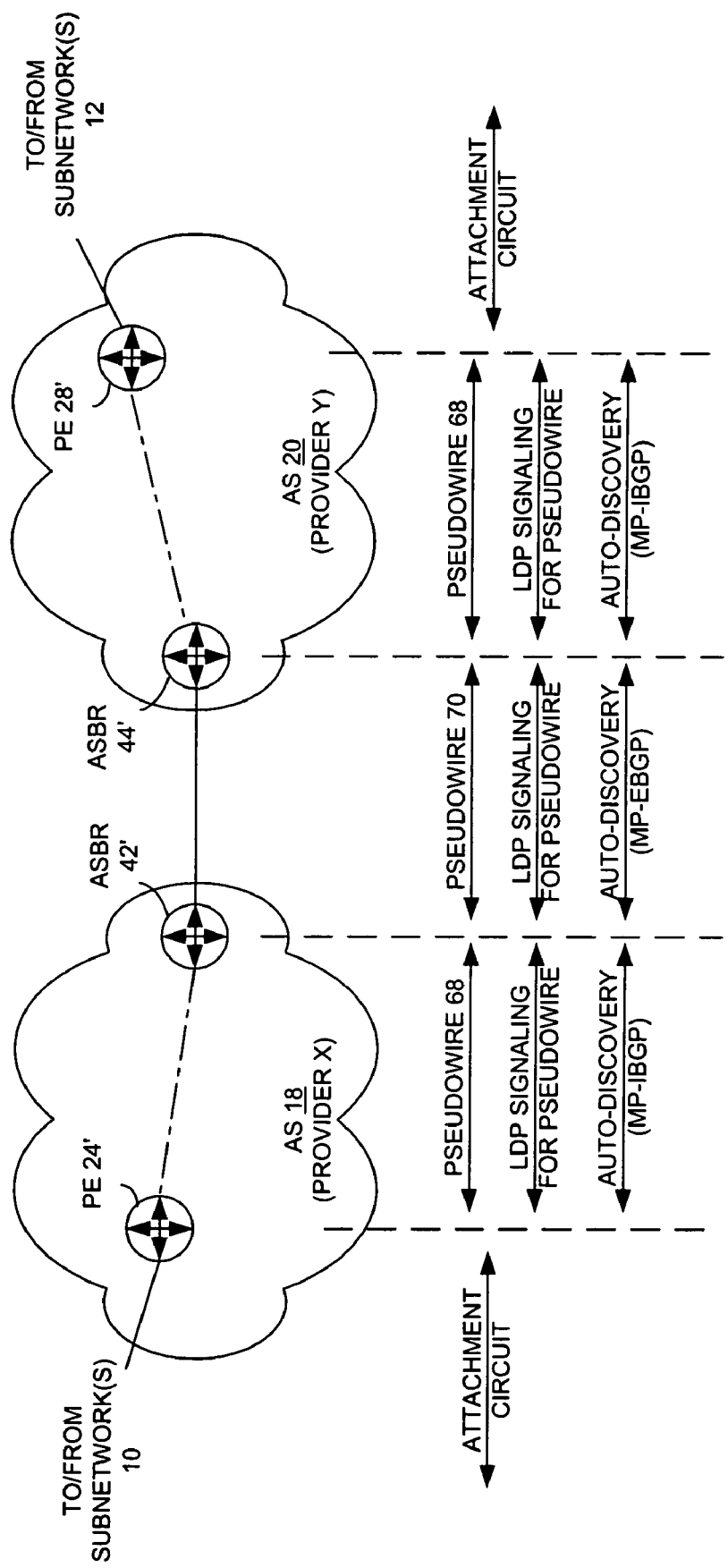
FIG. 6 is a block diagram depicting connections and multiple-layer communications according to a second approach for layer-2 VPN auto-discovery and signaling in the network of FIG. 1.
Figure 7:
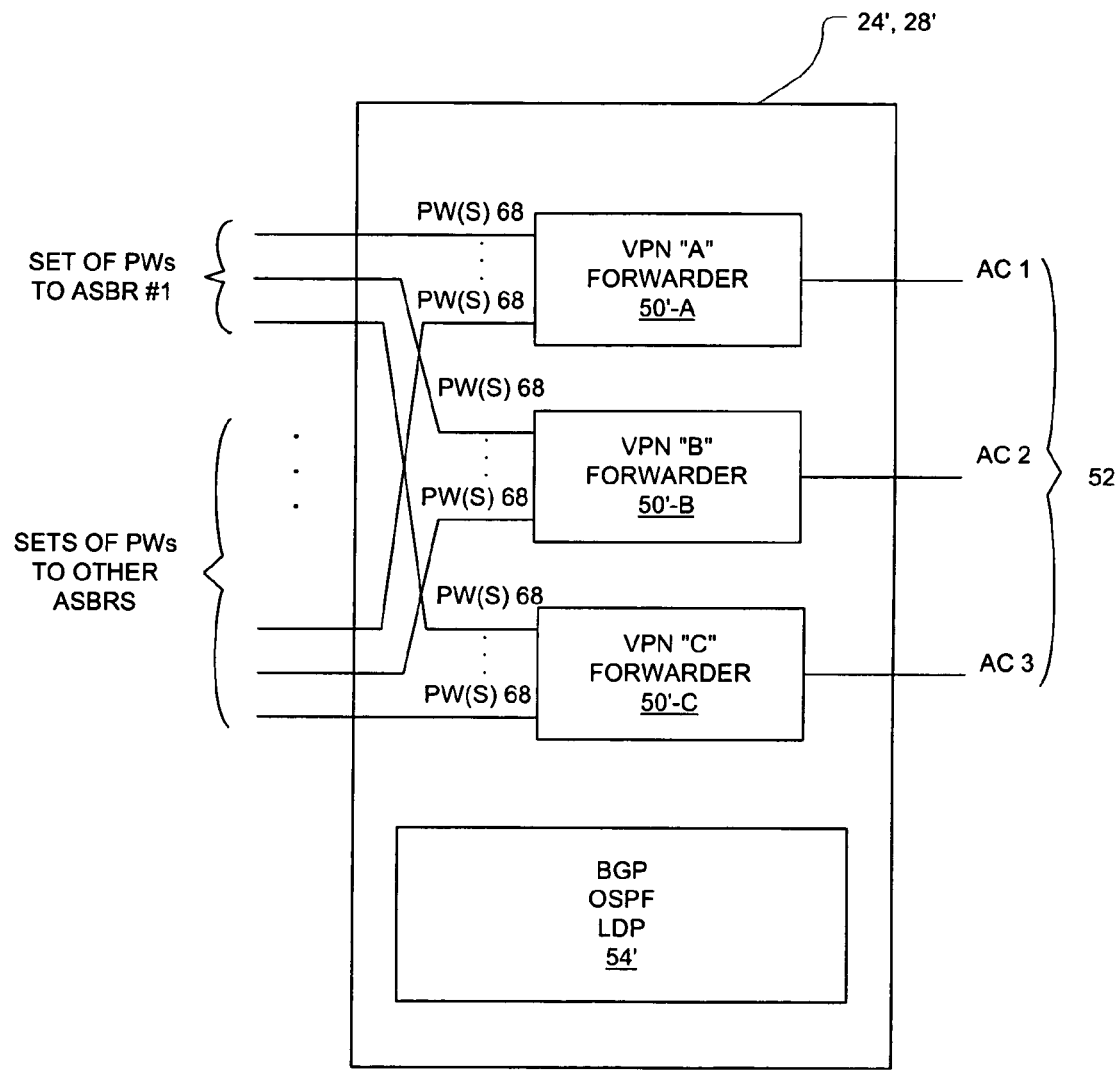
FIG. 7 is a block diagram of a PE router of FIG. 6.
Figure 8:
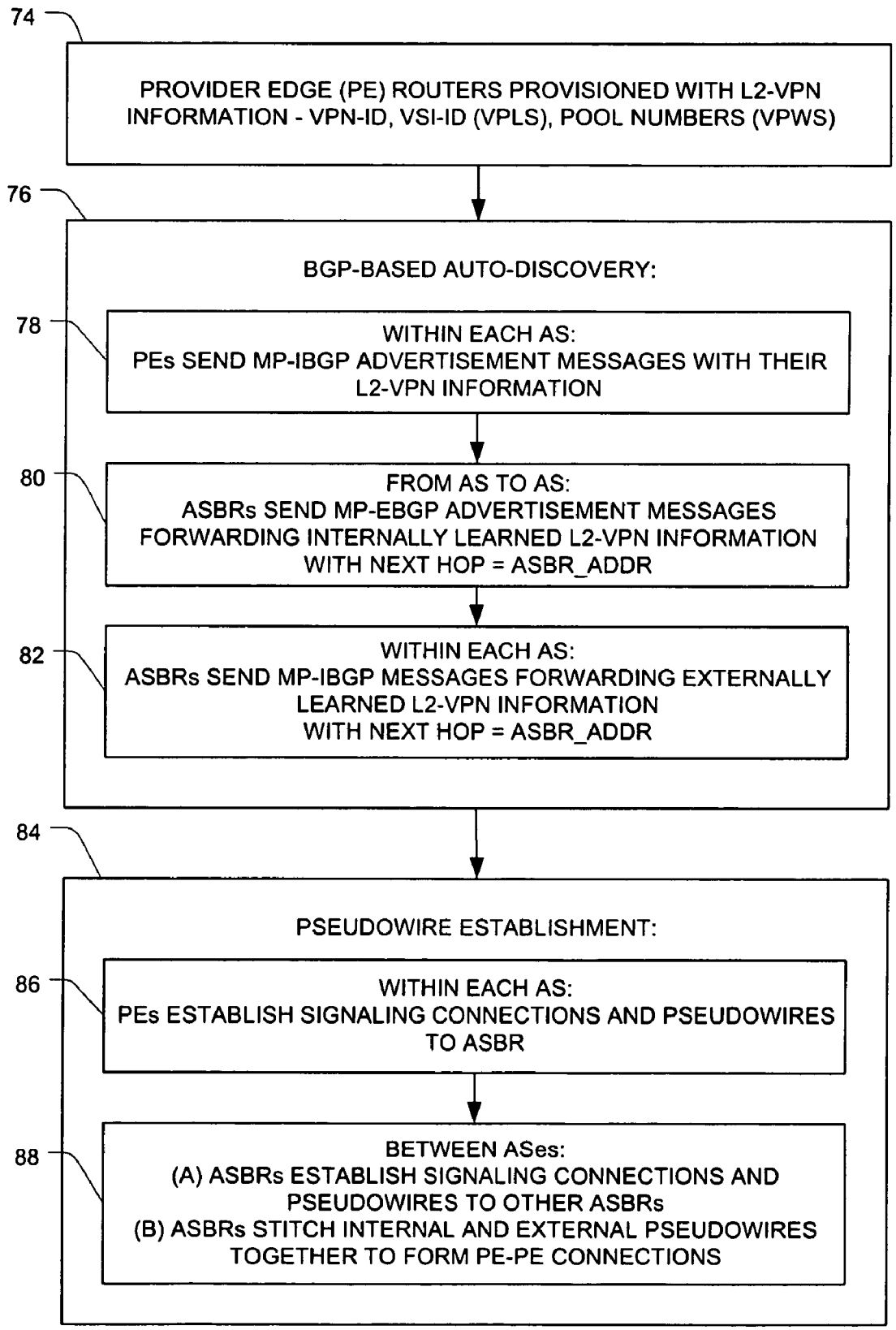
FIG. 8 is a flow diagram illustrating a process by which layer-2 VPNs are formed in the network of FIG. 1 according to the first approach depicted in FIG. 6.

FIGS. 6-8 illustrate a second approach to signaling and discovery for inter-AS L2-VPNs, which is referred to herein as "pseudowire switching." Referring to FIG. 6, it will be seen that it differs from FIG. 3 by the absence of a PE-PE tunnel LSP 46, and by the segmented nature of the LDP signaling and pseudowires as opposed to the end-to-end nature of those items in FIG. 3. In particular, each PE 24' and 28' engages in LDP signaling with a same-AS ASBR (e.g., PE 24' to ASBR 42') and establishes internal (intra-AS) pseudowires 68 therewith, and the ASBRs signal each other (e.g. ASBRs 42' and 44') and establish external (inter-AS) pseudowires 70 between themselves. Each ASBR is responsible for stitching the internal pseudowires 68 and external pseudowires 70 together to provide the required PE-to-PE connectivity. Such pseudowire stitching is known in the art. Among the benefits of the illustrated approach in contrast to the above-described tunneling approach is that the LDP signaling connections are more limited and controlled. Each pair of ASBRs (e.g. ASBRs 42' and 44') need have only one LDP signaling connection per VPN regardless of the number of pseudowires. The ASBRs can more easily enforce any policies implemented by the network providers.

FIG. 7 shows the structure of the PEs 24', 28' for the pseudowire switching approach. The primary differences from FIG. 4 are the absence of the PE-PE tunnel LSPs 46, and the presence of sets of pseudowires 68 to each ASBR in the same AS, where each pseudowire 68 is part of a stitched PE-to-PE connection that travels through the respective ASBR.

FIG. 8 shows the auto-discovery and pseudowire-establishment process for the pseudowire switching approach. In step 74, the PEs are provisioned with L2-VPN information as in the tunneling approach. In step 76, BGP-based auto-discovery is carried out. Step 76 includes step 78, in which the PEs send their respective L2-VPN information to their same-AS ASBRs using MP-IBGP advertisement messages. In step 80, the ASBRs use MP-EBGP to forward the L2-VPN information to the ASBRs of other ASes, with each message having a next-hop address equal to the addresses of the forwarding ASBR. In step 82, each ASBR receiving L2-VPN from another ASBR uses MP-EBGP to forward it to the PEs of the same AS, again with each message having a next-hop address equal to the addresses of the forwarding ASBR. In this manner, each PE router learns the addresses of local ASBRs through which PEs of common L2-VPNs can be reached, and likewise each ASBR learns the addresses of ASBRs of other ASes through which PEs connected to L2-VPNs can be reached.

In step 84, the pseudowires 68, 70 are established. Step 84 includes step 86, in which each PE router establishes internal LDP signaling connections and pseudowires 68 with their local ASBRs. In step 88, the ASBRs establish external LDP signaling connections and pseudowires 70 among themselves, and then stitch the internal pseudowires 68 and external pseudowires 70 together to form the PE-to-PE connections.

As noted above, the disclosed techniques can be used when there are one or more transit ASes between the two ASes that contain PE routers connected to customer subnetworks. For the tunneling approach, the ASBRs of any such transit ASes must propagate the BGP discovery messages and the signaling that establishes the PE-PE tunnels 46. For the PW-switching approach, PW signaling connections and PWs are established in a hop-by-hop fashion among ASBRs of transit ASes lying along the path between the end-most ASes, and each such ASBR stitches together the PWs that it terminates. In general, each end-most AS will have a respective external signaling connection and one or more respective external PWs to an adjacent ASBR. When the end-most ASes are neighboring ASes and there are no intervening transit ASes, each such external signaling connection and PW of each AS is terminated directly at an ASBR of the other AS.

The auto-discovery and signaling techniques described herein can be utilized with so-called "distributed VPLS" service. In distributed VPLS, the functions of a PE router are divided between a "network PE" router (N-PE) and one or more "user PE" routers (U-PEs). The U-PEs perform address learning and bridging functions of the virtual private LAN(s) that they are part of, and the N-PEs provide the interface to the provider network. The pseudowires run between pairs of U-PEs, which is where the VSIs reside. The N-PE is responsible for generating BGP advertisements on behalf of each VSI it supports, which includes those located in the U-PEs to which the N-PE is connected. It is necessary to use a unique identifier for each VSI. This can be done, for example, by combining the IP address of each U-PE with the RD for the VPLS instance (i.e., the VPN-ID). Alternative unique VSI identifiers may also be employed.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of providing layer-2 virtual private network (L2-VPN) services in a multiple-autonomous-system network, comprising:
   (1) initially performing an auto-discovery process including:
      (i) in a first provider edge (PE) router of a first autonomous system (AS), sending a first internal routing Information (R-I) message to a first border router of the first AS, the first internal R-I message including network layer reachability information (NLRI) for a first L2-VPN forwarder operating within the first PE router, the NLRI including an identifier of a VPN and an identifier of the first L2-VPN forwarder;
      (ii) in the first border router in response to receiving the first internal R-I message, sending a first external R-I message along a path between the first AS and a second AS, the first external R-I message forwarding the NLRI of the first L2-VPN forwarder and identifying the first border router as a router through which the first L2-VPN forwarder can be reached;
      (iii) in a second border router of the second AS, receiving the first external R-I message, the first external R-I message including the NLRI of the first L2-VPN forwarder and identifying the first border router along the path between the first and second ASes as a router through which the first L2-VPN forwarder can be reached; and
      (iv) in the second border router in response to receiving the first external R-1 message, sending a second internal R-1 message to a second PE router of the second AS, the second internal R-1 message including the NLRI of the first L2-VPN forwarder and identifying the second border router as a router through which the first L2- VPN forwarder can be reached; and
   (2) subsequently performing a pseudowire establishment process including:
      (i) within each of the first and second ASes, establishing respective direct internal signaling connections and internal pseudo wires between the respective PE router and border router of the respective ASes; and
      (ii) at each of the first and second border routers, (a) establishing respective external signaling connections and external pseudowires along the path between the first and- second ASes and (b) stitching the respective external and internal pseudowires together to form at least part of an end-to-end connection between the first L2-VPN forwarder and a second L2-VPN forwarder in the second PE router over which communications of the VPN are to be carried, the first and second border routers stitching the respective external and internal pseudowires using endpoint identifiers learned from a border gateway protocol (BGP),
   wherein the first AS is different than the second AS.

2. A method according to claim 1, wherein (1) the first and second ASes are neighboring ASes, (2) the first and second external R-I messages are both a single external R-I message sent from the first border router to the second border router, (3) the respective external signaling connections of the first and second border routers are both a single signaling connection between the first and second border routers, and (4) the stitched-together external and internal pseudowires form the complete end-to-end connection between the first L2-VPN forwarder and the second L2-VPN forwarder.

3. A method according to claim 1, wherein (1) the first and second ASes are non-neighboring ASes separated by one or more transit ASes, (2) the first external R-I message is sent to a third border router of a first one of the transit ASes, and the second external R-I message is sent by a fourth border router of a second one of the transit ASes and identifies the fourth border router as the border router through which the first L2 VPN forwarder can be reached, (3) the external signaling connections and external pseudowires of the first border router extend to the third border router, and the external signaling connections and external pseudowires of the second border router extend to the fourth border router, and (4) the complete end-to-end connection between the first L2-VPN forwarder and the second L2-VPN forwarder includes the stitched-together external and internal pseudo wires as well as additional pseudo wires within and among the transit ASes.

4. A method according to claim 3, wherein the first and second transit ASes are a single transit AS.

5. A method according to claim 3, wherein the first and second transit ASes are separate transit autonomous systems.

6. A method according to claim 1, wherein the VPN is a virtual-private-LAN-service (VPLS) VPN and the L2-VPN forwarders are virtual switching instances (VSIs) of the VPLS VPN.

7. A method according to claim 1, wherein the VPN is a virtual-private-wire-service (VPWS) VPN, and wherein the NERI for each L2-VPN forwarder includes a pool number for a respective pool of attachment circuits associated with the VPWS VPN.

8. A method of providing layer-2 virtual private network (L2-VPN) services in a multiple-autonomous-system network, comprising:
   (1) initially participate in an auto-discovery process including:
      (i) receiving, from a first provider edge (PE) router of a first autonomous system (AS), a first internal routing information (R-I) message, the first internal R-I message including network layer reachability information (NLRI) for a first L2-VPN forwarder operating within the first PE router, the NLRI including an identifier of a VPN and an identifier of the first L2-VPN forwarder; and (ii) in response to receiving the first internal R-I message, sending a first external R-I message along a path between the first AS and a second border router of a second AS, the first external R-I message forwarding the NLRI of the first L2-VPN forwarder and identifying a first border router as a router through which the first L2-VPN forwarder can be reached; and (2) subsequently participate in a pseudowire establishment process including:

(i) establishing an internal signaling connection and an internal pseudowire to the first PE router;

(ii) establishing direct external signaling connection and an external pseudowire along the path between the first and second ASes; and (iii) stitching the external and internal pseudo wires together to form at least part of an end-to-end connection between the first L2-VPN forwarder and a second L2-VPN forwarder in the second PE router over which communications of the VPN are to be carried, the first and second border routers stitching the respective external and internal pseudowires using endpoint identifiers learned from a border gateway protocol (BGP), wherein the first AS is different than the second AS.

* * * * *